United States Patent
Amano

(10) Patent No.: US 9,193,278 B2
(45) Date of Patent: Nov. 24, 2015

(54) VEHICLE AND METHOD OF CONTROLLING VEHICLE

(75) Inventor: Takashi Amano, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/344,413

(22) PCT Filed: Sep. 27, 2011

(86) PCT No.: PCT/JP2011/071978
§ 371 (c)(1),
(2), (4) Date: Mar. 12, 2014

(87) PCT Pub. No.: WO2013/046313
PCT Pub. Date: Apr. 4, 2013

(65) Prior Publication Data
US 2014/0379187 A1 Dec. 25, 2014

(51) Int. Cl.
*B60L 15/20* (2006.01)
*H02P 9/00* (2006.01)
*B60W 20/00* (2006.01)
*B60W 10/06* (2006.01)
*B60W 10/08* (2006.01)
(Continued)

(52) U.S. Cl.
CPC ............... *B60L 15/20* (2013.01); *B60K 6/445* (2013.01); *B60W 10/06* (2013.01); *B60W 10/08* (2013.01); *B60W 20/10* (2013.01); *H02P 9/00* (2013.01); *B60W 2030/1809* (2013.01); *Y02T 10/6239* (2013.01); *Y02T 10/6286* (2013.01); *Y10S 903/93* (2013.01)

(58) Field of Classification Search
CPC .......... B60L 15/20; H02P 9/00; Y10S 903/93; B60W 10/06; B60W 10/08; B60W 20/10
USPC .................... 701/22, 99; 180/65.265; 903/930
See application file for complete search history.

(56) References Cited

U.S. PATENT DOCUMENTS 7,356,391 B2    4/2008  Matsuda et al.
8,433,465 B2    4/2013  Yamazaki et al.
(Continued)

FOREIGN PATENT DOCUMENTS

JP    A-50-90020       7/1975
JP    2000008902 A     1/2000
(Continued)

OTHER PUBLICATIONS

Feb. 6, 2015 Office Action issued in U.S. Appl. No. 14/344,511.
(Continued)

*Primary Examiner* — Mary Cheung
*Assistant Examiner* — Brian P Sweeney
(74) *Attorney, Agent, or Firm* — Oliff PLC

(57) ABSTRACT

A vehicle includes a motor generator and an engine generating driving power for running, and an ECU for controlling the motor generator and the engine. If user request power and a vehicle speed are substantially constant when inertial running control is selected by a user, the ECU causes driving power variation operation to be performed on the motor generator and the engine in which the motor generator and the engine are switched between a low output state and a high output state. The vehicle runs with inertial force of the vehicle in the low output state. As a result, energy efficiency during vehicle running can be improved.

11 Claims, 7 Drawing Sheets

(51) Int. Cl.
*B60K 6/445* (2007.10)
*B60W 30/18* (2012.01)

(56) References Cited

U.S. PATENT DOCUMENTS

| | | |
|---|---|---|
| 2004/0134697 A1 | 7/2004 | Kobayashi et al. |
| 2004/0154853 A1 | 8/2004 | Aikawa et al. |
| 2006/0048982 A1 | 3/2006 | Yamamoto et al. |
| 2009/0146615 A1 | 6/2009 | Zillmer et al. |
| 2009/0211826 A1 | 8/2009 | Hashimoto |
| 2010/0087288 A1 | 4/2010 | Yamamoto |
| 2011/0192666 A1 | 8/2011 | Schmid et al. |

FOREIGN PATENT DOCUMENTS

| | | | | |
|---|---|---|---|---|
| JP | 2001157305 A | 6/2001 | | |
| JP | A-2007-187090 | 7/2007 | | |
| JP | A-2008-520485 | 6/2008 | | |
| JP | A-2009-298232 | 12/2009 | | |
| JP | 2010-006309 A | * 1/2010 | ............ | B60K 6/445 |
| JP | A-2010-6309 | 1/2010 | | |

OTHER PUBLICATIONS

U.S. Appl. No. 14/344,511, filed Mar. 12, 2014 in the name of Amano.

May 13, 2015 Notice of Allowance issued in U.S. Appl. No. 14/344,511.

Jul. 24, 2015 Supplemental Notice of Allowability issued in U.S. Appl. No. 14/344,511.

Sep. 18, 2015 Supplemental Notice of Allowability issued in U.S. Appl. No. 14/344,511.

* cited by examiner

VEHICLE AND METHOD OF CONTROLLING VEHICLE

TECHNICAL FIELD

The present invention relates to vehicles and methods of controlling the vehicles, and more particularly to running control of a vehicle running with inertial force of the vehicle.

BACKGROUND ART

In recent years, vehicles incorporating a power storage device (such as a secondary battery or capacitor) and running with driving power generated from electric power stored in the power storage device have been receiving attention as environmentally friendly vehicles. Examples of such vehicles include an electric vehicle, a hybrid vehicle, and a fuel cell vehicle.

There is a need to improve energy efficiency of these vehicles by increasing gasoline mileage and electric mileage, so as to further reduce environmental loads.

Japanese National Patent Publication No. 2008-520485 (Patent Document 1) discloses a hybrid vehicle including an internal combustion engine and a motor generator, in which the motor generator is controlled, when in a generator mode, in such a manner that the motor generator alternates between a first interval during which the motor generator is driven to operate with a high output which is greater than an actual power consumption of a vehicle electrical system and a second interval during which the motor generator is switched off.

According to Japanese National Patent Publication No. 2008-520485 (Patent Document 1), when the motor generator operates as a generator, the motor generator is driven at an operating point of high efficiency in the first interval and the motor generator is stopped in the second interval. As a result, continuation of the operation of the motor generator with low efficiency during operation of electric power generation can be suppressed, thus improving energy efficiency of the vehicle during the operation of electric power generation.

Japanese Patent Laying-Open No. 2010-6309 (Patent Document 2) discloses a hybrid vehicle including an internal combustion engine and a motor generator, which is configured to alternate between running with driving power generated by the internal combustion engine and running in an inertial state in which the internal combustion engine is stopped. As a result, the internal combustion engine can be driven at an operating point of high efficiency, thus improving gasoline mileage.

CITATION LIST

Patent Documents

PTD 1: Japanese National Patent Publication No. 2008-520485
PTD 2: Japanese Patent Laying-Open No. 2010-6309
PTD 3: Japanese Patent Laying-Open No. 2009-298232
PTD 4: Japanese Patent Laying-Open No. 2007-187090

SUMMARY OF INVENTION

Technical Problem

In the configuration of Japanese National Patent Publication No. 2008-520485 (Patent Document 1) described above, however, driving and stopping of the motor generator is repeated when the motor generator generates electric power, rather than varying the driving power for running the vehicle.

In the configuration disclosed in Japanese Patent Laying-Open No. 2010-6309 (Patent Document 2), driving and stopping of an engine which is the internal combustion engine is repeated in the hybrid vehicle.

When driving and stopping of a driving source is repeated as described above, a loss may occur during a shift to (at the start of) a driven state from a stopped state.

The present invention has been made in order to solve such problems, and an object of the present invention is to improve energy efficiency during running of a vehicle capable of running with driving power from a plurality of driving sources.

Solution to Problem

A vehicle according to the present invention includes a first driving source and a second driving source generating driving power for running the vehicle, and a control device for controlling the first and second driving sources. The control device causes the vehicle to run while causing driving power variation operation to be performed on the first driving source in which the first driving source is switched between a first state where the first driving source generates driving power of a first level and a second state where the first driving source generates driving power larger than the driving power in the first state, and causing driving power variation operation to be performed on the second driving source in which the second driving source is switched between a third state where the second driving source generates driving power of a second level and a fourth state where the second driving source generates driving power larger than the driving power in the third state.

Preferably, the control device causes the driving power variation operation to be performed on the first and second driving sources, when driving power requested by a user varies within a prescribed range.

Preferably, the control device causes the first driving source to be switched between the first state and the second state so as to maintain a speed of the vehicle within an acceptable range, while the driving power variation operation is performed on the first and second driving sources.

Preferably, the control device causes the first driving source to be switched to the first state in response to an increase in the speed of the vehicle to an upper limit of the acceptable range, and causes the first driving source to be switched to the second state in response to a decrease in the speed of the vehicle to a lower limit of the acceptable range.

Preferably, the control device causes the second driving source to be switched to the fourth state during a period when the first driving source is in the second state.

Preferably, the control device causes the second driving source to be switched to the third state during a period when the first driving source is in the first state, and causes the second driving source to be switched to the fourth state during a period when the first driving source is in the second state.

Preferably, a sum of the driving power generated by the first driving source in the first state and the driving power generated by the second driving source in the third state is set to be smaller than reference driving power of constant output capable of maintaining a speed of the vehicle. A sum of the driving power generated by the first driving source in the second state and the driving power generated by the second driving source in the fourth state is set to be larger than the reference driving power.

Preferably, the vehicle runs mainly with inertial force of the vehicle when the first driving source is in the first state.

Preferably, the first driving source is an engine, and the second driving source is a rotating electric machine.

Preferably, the first driving source is a rotating electric machine, and the second driving source is an engine.

Preferably, each of the first and second driving sources is a rotating electric machine.

A method of controlling a vehicle according to the present invention is a method of controlling a vehicle including a first driving source and a second driving source. The control method includes the steps of driving the first driving source so as to switch the first driving source between a state where the first driving source generates driving power of a first level and a state where the first driving source generates driving power larger than the driving power of the first level, driving the second driving source so as to switch the second driving source between a state where the second driving source generates driving power of a second level and a state where the second driving source generates driving power larger than the driving power of the second level, and running the vehicle with the driving power from the first and second driving sources.

Advantageous Effects of Invention

According to the present invention, energy efficiency can be improved during running of a vehicle capable of running with driving power from a plurality of driving sources.

DESCRIPTION OF EMBODIMENTS

Figure 1:
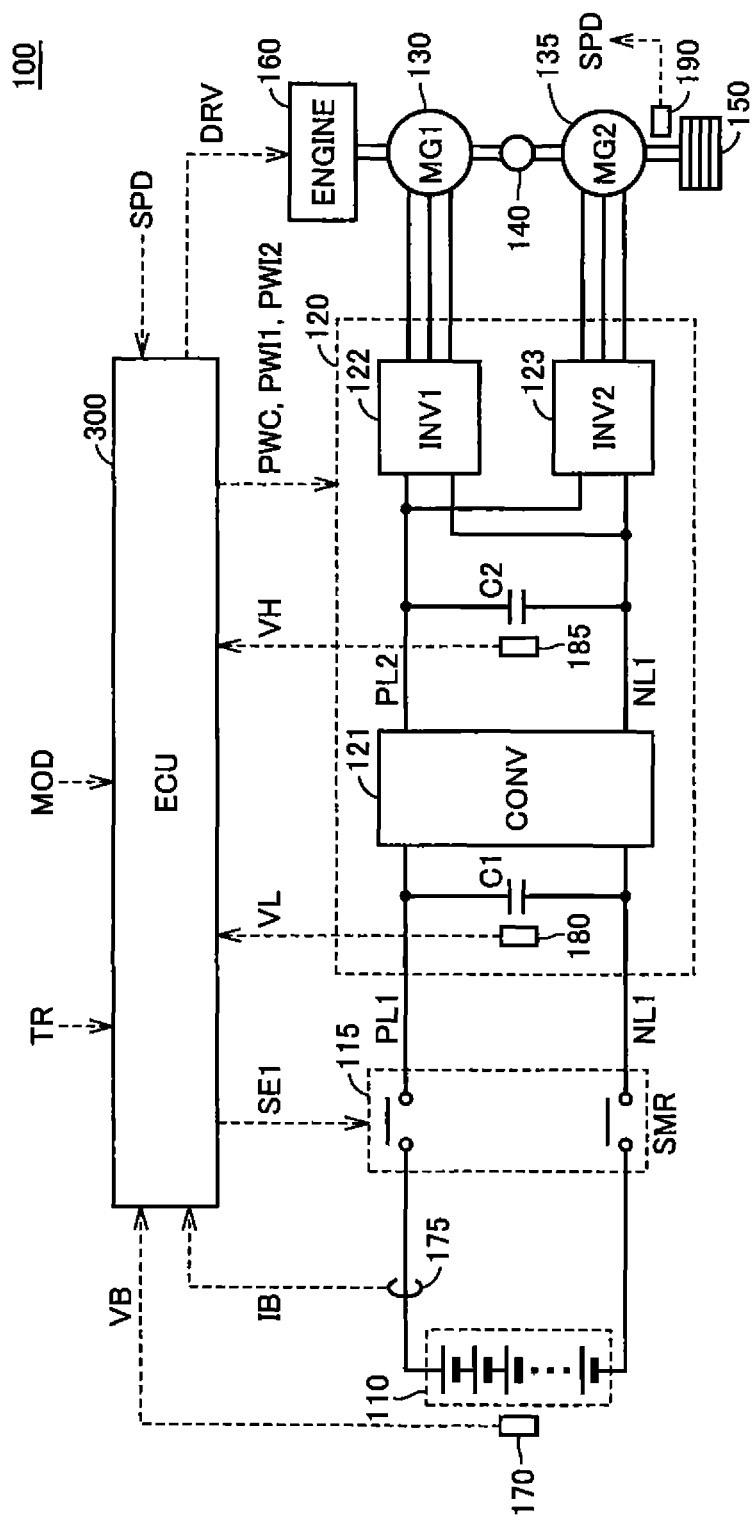
FIG. 1 is an overall block diagram of a hybrid vehicle according to an embodiment.

Embodiments of the present invention will be hereinafter described in detail with reference to the drawings, in which the same or corresponding elements are designated by the same reference characters, and the description thereof will not be repeated.

FIG. 1 is an overall block diagram of a vehicle 100 according to an embodiment of the present invention. As will be described below in detail, vehicle 100 is a hybrid vehicle including a rotating electric machine and an engine as driving sources.

Referring to FIG. 1, vehicle 100 includes a power storage device 110, a system main relay (SRM) 115, a PCU (Power Control Unit) 120 which is a driving device, motor generators 130, 135, a power transmission gear 140, a drive wheel 150, an engine 160 which is an internal combustion engine, and an ECU (Electronic Control Unit) 300 which is a control device. PCU 120 includes a converter 121, inverters 122, 123, voltage sensors 180, 185, and capacitors C1, C2.

Power storage device 110 is an electric power storage component configured in a chargeable/dischargeable manner. Power storage device 110 includes a secondary battery such as a lithium-ion battery, a nickel-metal hydride battery or a lead-acid battery, or a power storage element such as an electric double layer capacitor.

Power storage device 110 is connected to PCU 120 through power lines PL1 and NL1. Power storage device 110 supplies PCU 120 with electric power for generating driving power for vehicle 100. Power storage device 110 stores electric power generated by motor generator 130. An output of power storage device 100 is, for example, about 200 V.

Power storage device 110 is provided with a voltage sensor 170 and a current sensor 175. Voltage sensor 170 detects a voltage VB of power storage device 110, and outputs the result of the detection to ECU 300. Current sensor 175 detects a current IB input to and output from the power storage device, and outputs the detected values to ECU 300.

SMR 115 includes a relay having one end connected to a positive electrode terminal of power storage device 110 and the other end connected to power line PL1 that is connected to PCU 120, and another relay having one end connected to a negative electrode of power storage device 110 and the other end connected to power line NL1 that is connected to PCU 120. In response to a control signal SE1 from ECU 300, SMR 115 switches between supply and interruption of electric power between power storage device 110 and PCU 120.

In response to a control signal PWC from ECU 300, converter 121 converts a voltage between power lines PL1, NL1 and power lines PL2, NL1.

Inverters 122, 123 are connected in parallel to converter 121 through power lines PL2, NL1.

Inverter 122 is controlled by a control signal PWI1 from ECU 300, and converts DC power from converter 121 to AC power, to drive motor generator 130 (hereinafter also referred to as an "MG1"). Inverter 122 also converts AC power generated by motor generator 130 to DC power, and charges power storage device 110 through converter 121.

Inverter 123 is controlled by a control signal PWI2 from ECU 300, and converts DC power from converter 121 to AC power, to drive motor generator 135 (hereinafter also referred to as an "MG2"). Inverter 123 also converts AC power generated by motor generator 135 to DC power, and charges power storage device 110 through converter 121.

Motor generators 130, 135 are AC rotating electric machines, for example, permanent magnet synchronous motors including a rotor into which a permanent magnet is embedded.

Motor generators 130, 135 have output shafts coupled to power transmission gear 140 including a power split device such as a planetary gear. Driving power from motor generators 130, 135 is transmitted to drive wheel 150.

Motor generators 130, 135 are also coupled to engine 160 through power transmission gear 140. Engine 160 is controlled by a control signal DRV from ECU 300. Driving power generated by engine 160 is transmitted to drive wheel 150 and motor generator 130 through power transmission gear 140. ECU 300 cooperatively controls driving power generated by motor generators 130, 135 and engine 160, to run the vehicle.

During regenerative braking operation of vehicle 100, motor generators 130, 135 can generate electric power by being rotated by drive wheel 150. The generated electric power is then converted to charging power for power storage device 110.

In this embodiment, motor generator 130 is used exclusively as a starter motor when starting engine 160 and as a generator for generating electric power by being driven by engine 160. Motor generator 135 is used exclusively as a motor for driving drive wheel 150 by using the electric power from power storage device 110.

Although FIG. 1 shows an exemplary configuration where two motor generators and one engine are provided, the number of motor generators is not limited as such. For example, one motor generator may be provided. Alternatively, more than two motor generators may be provided.

Capacitor C1 is provided between power lines PL1 and NL1, and reduces voltage variation between power lines PL1 and NL1. Capacitor C2 is provided between power lines PL2 and NL1, and reduces voltage variation between power lines PL2 and NL1.

Voltage sensors 180 and 185 detect voltages VL and VH across capacitors C1 and C2, respectively, and output the detected values to ECU 300.

A speed sensor 190 is provided in the vicinity of drive wheel 150 so as to detect the speed of vehicle 100 (vehicle speed). Speed sensor 190 detects a vehicle speed SPD based on a rotational speed of drive wheel 150, and outputs the detected value to ECU 300. As a speed sensor, a rotation angle sensor (not shown) for detecting a rotation angle of motor generator 135 may be used. In this case, ECU 300 causes vehicle speed SPD to be indirectly computed based on temporal variation in rotation angle of motor generator 135, a reduction ratio and the like.

Although not shown in FIG. 1, ECU 300 includes a CPU (Central Processing Unit), a storage device and an input/output buffer, causes input of signals from various sensors and the like and output of control signals to various devices, and controls the various devices of power storage device 110 and vehicle 100. Such control is not limited to software processing, but may be processed by dedicated hardware (electronic circuitry).

ECU 300 causes generation and output of control signals for controlling PCU 120, SMR 115 and the like. Although FIG. 1 shows a configuration where one control device is provided as ECU 300, a control device may be provided for each function or for each device to be controlled, such as a control device for PCU 120 and a control device for power storage device 110.

ECU 300 computes an SOC (State of Charge) of power storage device 110 based on the detected values of voltage VB and current IB from voltage sensor 170 and current sensor 175 provided on power storage device 110.

ECU 300 receives a request torque TR, which is determined based on operation of an accelerator pedal (not shown) by a user, from an upper ECU (not shown). ECU 300 causes generation of controls signals PWC, PWI1, PWI2 for converter 121 and inverters 122, 123 based on request torque TR from the user, respectively, to drive motor generators 130, 135.

ECU 300 also receives a mode signal MOD which is set by the user. This mode signal MOD is a signal for indicating whether or not inertial running control which will be described later should be performed. Mode signal MOD is switched through a specific switch or setting on an operation screen. Alternatively, mode signal MOD may be automatically set when specific conditions are satisfied.

For example, ECU 300 operates such that the inertial running control is performed when mode signal MOD is set to ON, and operates such that normal running is performed without the inertial running control when mode signal MOD is set to OFF.

In such a hybrid vehicle, the electric power in the power storage device is consumed when driving power is generated by the motor generator. The power storage device has a predetermined capacity. When the vehicle performs the so-called EV (Electric Vehicle) running only with the driving power from the motor generator, therefore, there is a need to improve energy efficiency during the running to suppress power consumption in order for the vehicle to run the longest distance possible with the electric power stored in the power storage device.

When the vehicle runs with the driving power from the engine in addition to the driving power from the motor generator, there is a need to reduce an amount of fuel consumed by the engine in order to improve the total efficiency of the vehicle.

Inertial force acts on a vehicle during vehicle running. Thus, if driving power generated by a motor generator and an engine during running is made lower than driving power required to maintain the vehicle speed, running with the inertial force of the vehicle (hereinafter also referred to as "inertial running") is continued for some time while the vehicle speed gradually decreases.

During this inertial running, the driving power output from the motor generator and the engine is smaller than constant driving power output for maintaining the vehicle speed, thus reducing power consumption by the power storage device and fuel consumption by the engine. Accordingly, if the vehicle can run utilizing the inertial running, energy efficiency during the vehicle running can be improved.

Thus, according to this embodiment, in the hybrid vehicle including the motor generator and the engine as driving sources, when the request torque from the user is substantially constant and the vehicle is running at a vehicle speed thereby maintained substantially constant, the inertial running control is performed to run the vehicle in which operation of repeating a high output state and a low output state in terms of driving power (hereinafter also referred to as "driving power variation operation") is performed on the motor generator and the engine. Energy efficiency during running may thus be improved.

Figure 2:
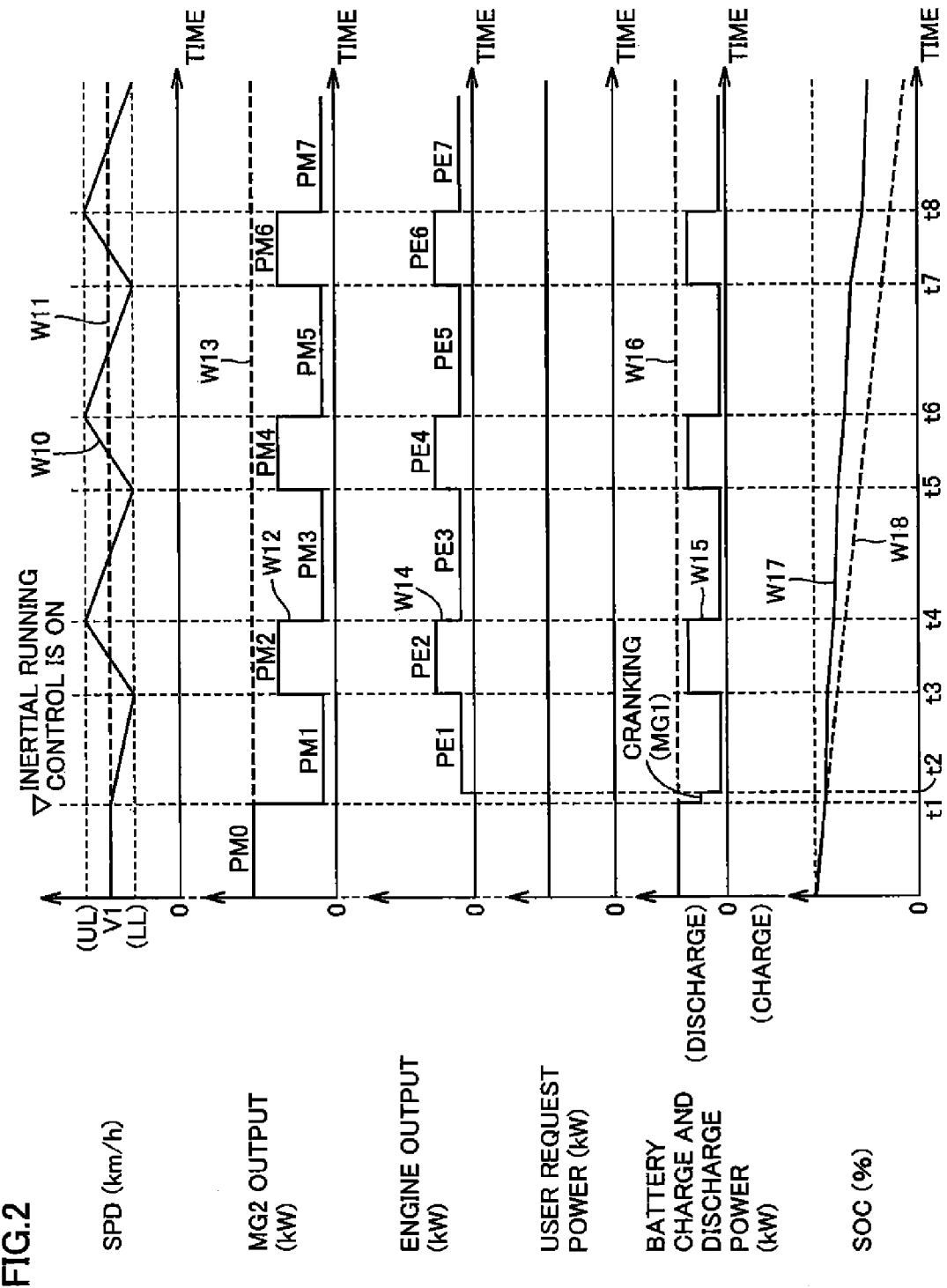
FIG. 2 is a first time chart illustrating the outline of inertial running control in the embodiment.
Figure 3:
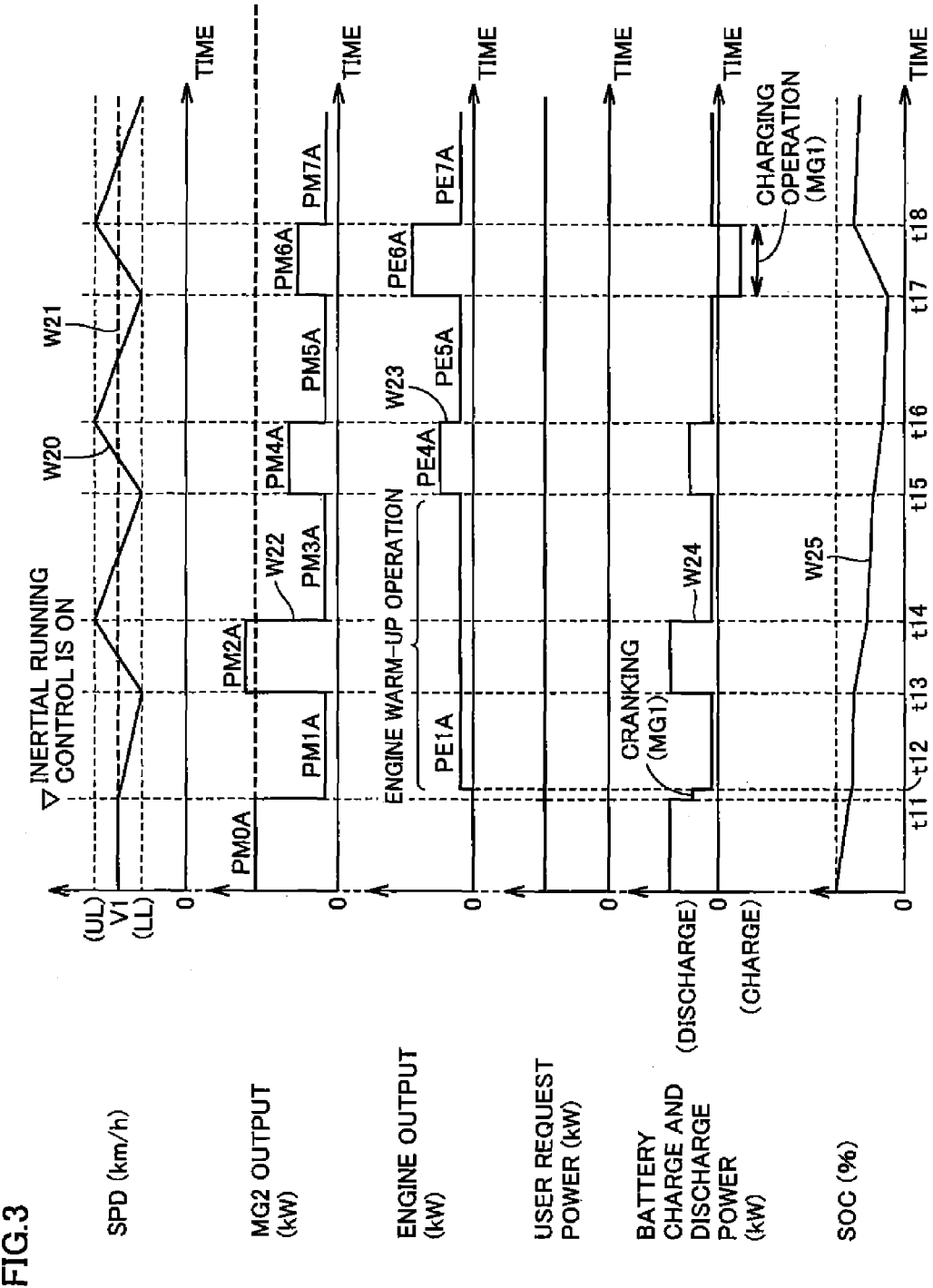
FIG. 3 is a second time chart illustrating the outline of inertial running control in the embodiment.
Figure 4:
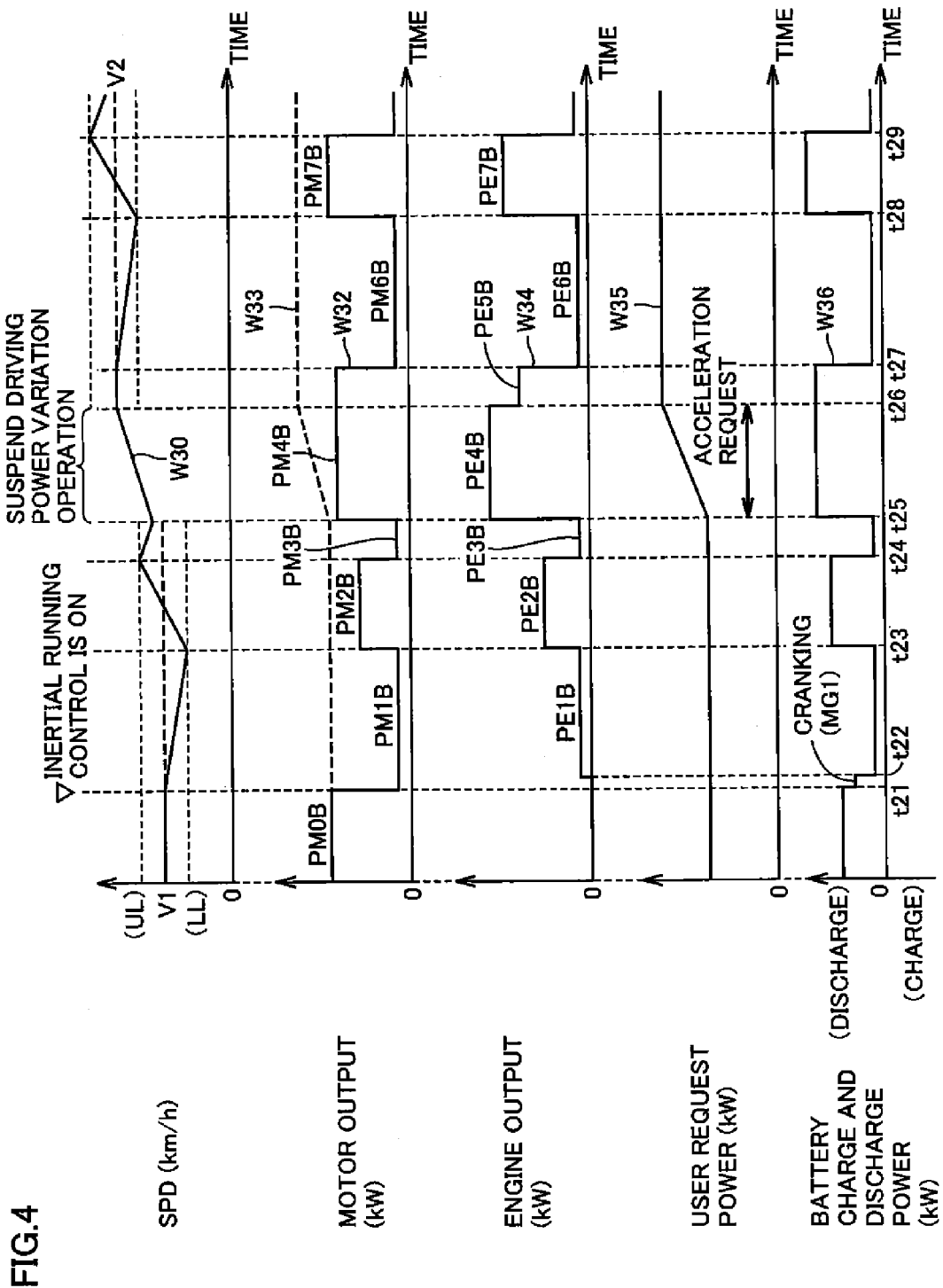
FIG. 4 is a time chart illustrating operation during acceleration in the inertial running control.

Referring now to FIGS. 2 to 4, the outline of the inertial running control in this embodiment will be described. FIG. 2 is a time chart illustrating a basic running pattern of the inertial running control in this embodiment. In FIG. 2 and FIG. 3 which will be described later, a horizontal axis represents time, and a vertical axis represents vehicle speed SPD, the output of the motor generator, the output of the engine, request power from the user, charge and discharge power of the power storage device, and the SOC of the power storage device. Regarding the charge and discharge power of the power storage device, the discharge power is represented as positive value and the charge power is represented as negative value.

Referring to FIGS. 1 and 2, it is assumed, for example, that vehicle 100 is running on a flat road at a constant vehicle speed V1. In this case, power requested by the user is given as a substantially constant value, as shown in FIG. 2. That "power requested by the user is a substantially constant value" refers to a state in which the user request power is maintained within a predetermined range (e.g., ±3 km/h) during a prescribed period of time, albeit with some variation.

In a comparative example to which the inertial running control in this embodiment is not applied, EV running is performed using a continuous output of substantially constant magnitude (PM0) from motor generator 135, for example, as indicated by a broken line W13 in FIG. 2. As such, vehicle speed SPD is maintained substantially constant, as indicated by a broken line W11 in FIG. 2.

At this time, power storage device 110 continuously outputs constant electric power as indicated by a broken line W16 in FIG. 2, causing the SOC of power storage device 110 to linearly decrease as indicated by a broken line W18 in FIG. 2.

In contrast, when the inertial running control in this embodiment is applied, acceleration running in which at least one of the driving power of motor generator 135 and the driving power of engine 160 is in a high output state, and inertial running in which both the driving power of motor generator 135 and the driving power of engine 160 are in a low output state are alternately repeated.

Specifically, until time t1, the inertial running control in this embodiment is not applied, and EV running is performed with continuous motor output PM0.

When the user indicates that the inertial running control should be performed at time t1, first, motor generator 135 is switched to a low output state with the driving power decreasing from PM0 to PM1 (a solid line W12 in FIG. 2).

Furthermore, in response to the indication that the inertial running control should be performed, engine 160 is cranked and started by motor generator 130 (MG1) between times t1 and t2. After self-sustained operation of engine 160 is established, engine 160 is put in a low output state such as an idle state while the driving power of motor generator 135 is in a low output state.

The sum of driving power PM1 from motor generator 135 and driving power PE1 from engine 160 in a low output state is smaller than the driving power capable of maintaining current vehicle speed V1. Thus, running with the inertial force is started and vehicle speed SPD gradually decreases, as indicated by a solid line W10 in FIG. 2.

At this time, the charge and discharge power of power storage device 110 decreases (a solid line W15 in FIG. 2). Thus, reduction in SOC can be suppressed (a solid line W17 in FIG. 2) as compared to the example where this embodiment is not applied.

Then, when vehicle speed SPD decreases to a lower limit value LL of a predetermined acceptable range with respect to target vehicle speed V1 (time t3 in FIG. 2), the driving power of motor generator 135 and engine 160 is switched to a high output state. The sum of motor output and engine output at this time (PM2+PE2) is set to be larger than output PM0 required to maintain vehicle speed V1. Vehicle 100 is thus accelerated.

Then, when vehicle speed SPD increases to an upper limit value UL of the predetermined acceptable range, motor generator 135 and engine 160 are switched to a low output state again (time t4 in FIG. 2) and inertial running is performed.

Then, in a similar manner, motor generator 135 and engine 160 are switched to a high output state when vehicle speed SPD decreases to lower limit value LL, and motor generator 135 and engine 160 are switched to a low output state when vehicle speed SPD increases to upper limit value UL.

By repeating the driving power variation operation in this manner, an average speed of vehicle speed SPD can be maintained substantially at V1, albeit with variation within the above acceptable range. Furthermore, by additionally using the engine having relatively high acceleration response, the driving power can be increased in quick response during acceleration running, while reduction in SOC of the power storage device can be suppressed. As a result, energy efficiency during running can be improved as a whole. Moreover, by preventing the engine from being stopped in a low output state, a loss involved with frequently performed startup operation can be reduced, and responsiveness during switching to acceleration running can be ensured.

It is to be noted that the total output (motor output+engine output) and acceleration time that are required to perform the acceleration running can be set in an arbitrary manner. For example, the acceleration time may be set to a prescribed period of time, and the total output may be set such that vehicle speed SPD can be increased from lower limit value LL to upper limit value UL during that period. Alternatively, the total output used for acceleration may be fixed to a prescribed output, and the acceleration time may be set depending on the situation. If the acceleration time is too short, however, large power is needed, which may cause torque shock. If the total output is too small, on the other hand, the acceleration time, namely, driving time of motor generator 135 and engine 160 is increased, making it difficult to perform inertial running. Therefore, the acceleration time and the total output during acceleration are set appropriately in consideration of drivability and energy efficiency.

Moreover, the allocation of motor output and engine output during the acceleration running is determined appropriately so as to optimize energy efficiency, based on the magnitude of total output required as well as the power consumption characteristic of motor generator 135 and the fuel consumption characteristic of engine 160.

It is to be noted that the total outputs in a high output state may be the same as or different from one another in magnitude. The total outputs in a low output state may likewise be the same as or different from one another in magnitude.

Although FIG. 2 shows an example where the motor generator and the engine are switched at the same timing between a high output state and a low output when the inertial running control is performed, the motor generator and the engine are not necessarily required to be switched at the same timing in this embodiment.

For example, as shown in a period between times t13 and t14 in FIG. 3, if acceleration running is performed when engine 160 itself and/or a catalyst for cleaning emissions have not been sufficiently warmed up after the inertial running control has been selected and the engine has been started, acceleration running may be performed only with the driving power from motor generator 135 while the warm-up operation is continued on engine 160 remaining in a low output state.

This prevents reduction in efficiency resulting from high-load operation while engine 160 has a low temperature, and deterioration in a state of emissions resulting from the catalyst having a low temperature.

When the SOC of power storage device 110 decreases to a prescribed threshold value at which power storage device 110 needs to be charged, as shown in a period between times t17 and t18 in FIG. 3, motor generator 130 (MG1) is driven by engine 160 during a period when motor generator 135 is in a high output state. As a result, acceleration running is performed with the driving power from engine 160 and the driving power from motor generator 135 (MG2), and power storage device 110 is charged with the electric power generated by motor generator 130 (MG1). In this case, the driving power of engine 160 is increased and the driving power of motor generator 135 is decreased as compared to those during acceleration running without the charging operation (between times t15 and t16 in FIG. 3).

In this manner, the ratio between the driving power from the motor generator and the driving power from the engine is set appropriately depending on the driving situation.

In the inertial running control according to this embodiment, as described above, the driving power variation operation as shown in FIGS. 2 and 3 is performed when the user request power is substantially constant. In other words, the driving power variation operation is not performed during acceleration and deceleration when the user request power varies.

Figure 5:
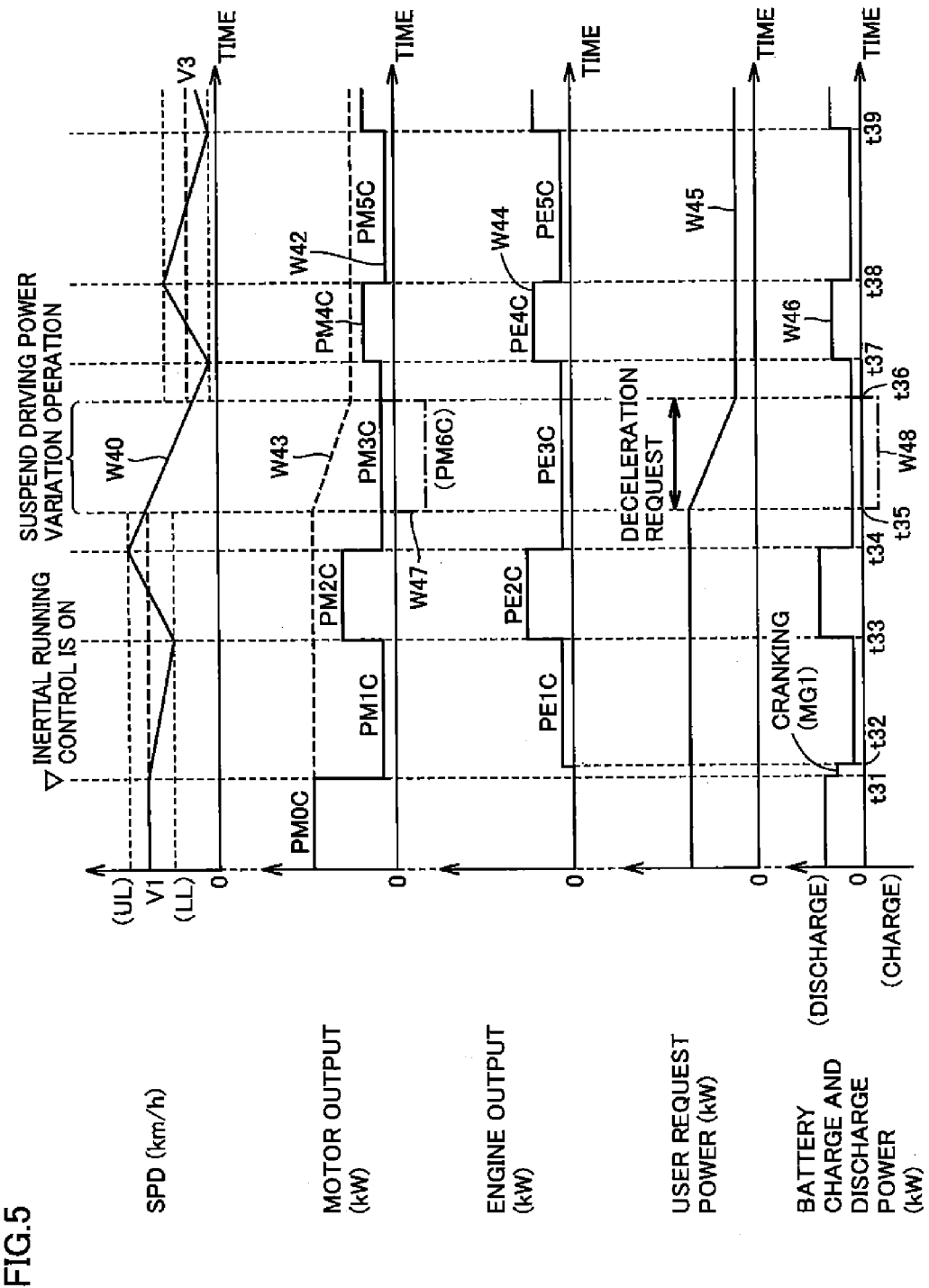
FIG. 5 is a time chart illustrating operation during deceleration in the inertial running control.

FIGS. 4 and 5 illustrate operations during acceleration and deceleration, respectively, when the inertial running control is applied. In FIGS. 4 and 5, a horizontal axis represents time, and a vertical axis represents vehicle speed SPD, the output of the motor generator, the output of the engine, request power from the user, and charge and discharge power of the power storage device.

Referring to FIGS. 1 and 4, when the user indicates that the inertial running control should be performed at time t21, as was described with reference to FIG. 2, the driving power variation operation is performed so as to maintain vehicle speed V1 until time t24.

Then, when an acceleration request is received with an increase in user request power at time t25 during inertial running (a solid line W35 in FIG. 4), the driving power variation operation is suspended while the user request power varies (between times t25 and t26). Then, the motor output and engine output are increased for acceleration (solid lines W32, W34 in FIG. 4).

Then, when the acceleration operation by the user ends and vehicle speed SPD becomes constant at V2 (V2>V1) at time t26, motor generator 135 and engine 160 are switched to a low output state again, and the driving power variation operation is resumed so as to maintain vehicle speed V2 (a solid line W30 in FIG. 4).

Next, the operation during deceleration is described with reference to FIG. 5. Referring to FIGS. 1 and 5, the driving power variation operation is performed at vehicle speed V1 until time t34, as with the period until time t24 in FIG. 4.

Then, when a deceleration request is received with a decrease in user request power at time t35 during inertial running (a solid line W46 in FIG. 5), the driving power variation operation is suspended while the user request power varies (between times t35 and t36). At this time, the motor output and engine output are put in a low output state, and the vehicle is decelerated while being maintained in an inertial running state (solid lines W42, W44 in FIG. 5). Although not shown in FIG. 5, when a deceleration request is received during acceleration running in the driving power variation operation, acceleration operation is suspended and the running is shifted to inertial running.

Alternatively, if the vehicle needs to be decelerated more quickly, regenerative braking may be performed by motor generator 135 during a period when a deceleration request is received. In this case, motor generator 135 outputs a negative motor output PM6C by regeneration (a chain-dotted line W47 in FIG. 5), and charges power storage device 110 with the generated electric power (a chain-dotted line W48 in FIG. 5). The SOC is thus increased.

In this manner, if the vehicle is accelerated or decelerated in response to the variation in user request power while the inertial running control is applied, the driving power variation operation of motor generator 135 and engine 160 is suspended.

Figure 6:
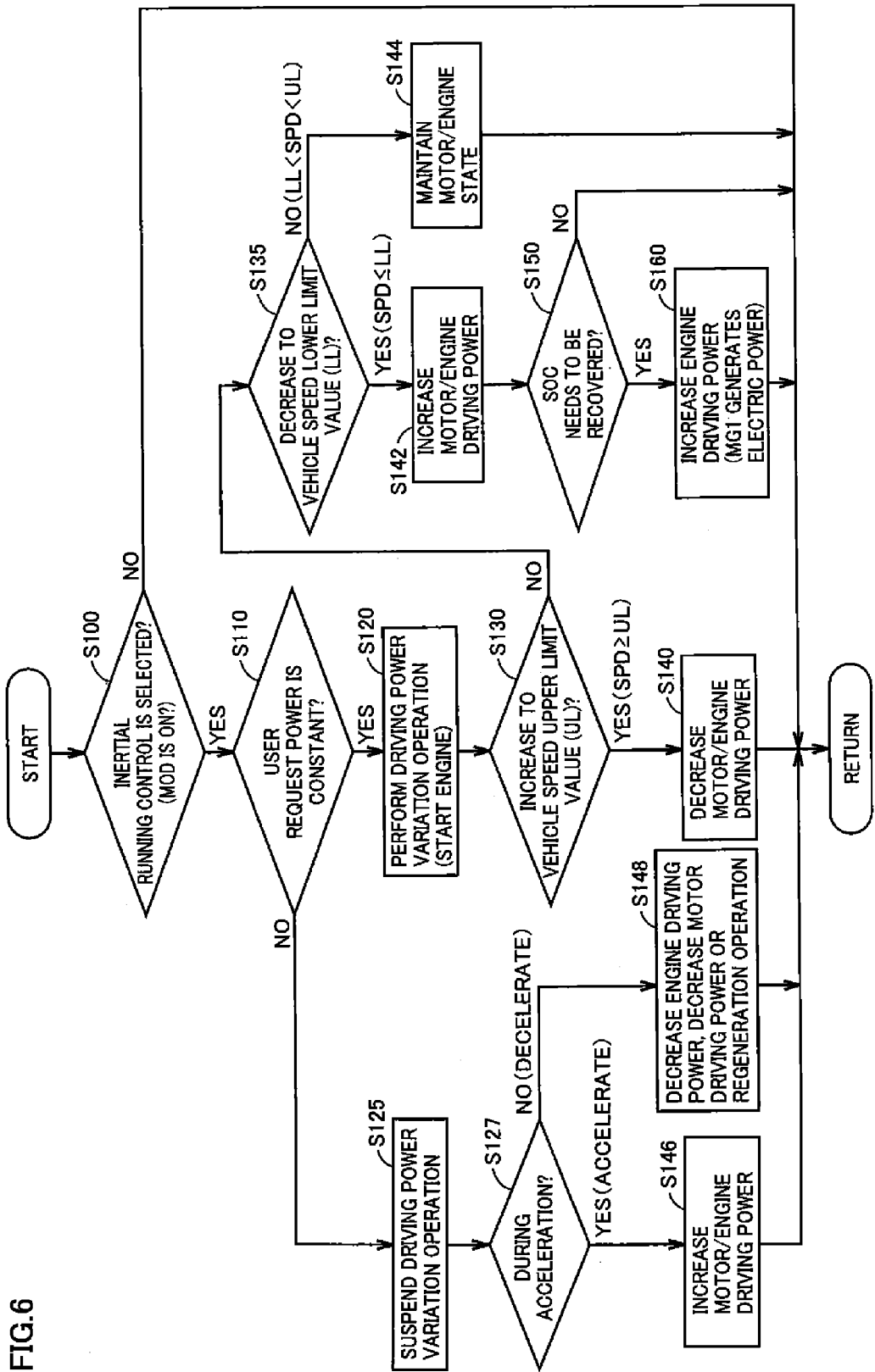
FIG. 6 is a flow chart illustrating a process of inertial running control performed by an ECU in the embodiment.

FIG. 6 is a flow chart illustrating the process of the inertial running control performed by ECU 300 in the embodiment. The steps in the flow chart shown in FIG. 6 are implemented by executing a program stored in advance in ECU 300 at regular intervals. Alternatively, processing of part of the steps may be implemented by building dedicated hardware (electronic circuitry).

Referring to FIGS. 1 and 6, in step (the step is hereinafter abbreviated as S) 100, ECU 300 causes a determination to be made of whether or not the inertial running control has been selected based on mode signal MOD which is set by the user.

If mode signal MOD has been set to OFF and the inertial running control has not been selected (NO in S100), the subsequent processing is skipped and ECU 300 causes the process to return to a main routine.

If mode signal MOD has been set to ON and the inertial running control has been selected (YES in S100), the process proceeds to S110, and ECU 300 then causes a determination to be made of whether or not the user request power is substantially constant based on request torque TR.

If the user request power is substantially constant (YES in S110), the process proceeds to S120, and ECU 300 causes the driving power variation operation to be performed. ECU 300 causes engine 160 to be started if engine 160 is in a stopped state. Although not shown in FIG. 6, immediately after the start of the driving power variation operation, motor generator 135 and engine 160 are initially put in a low output state and inertial running is performed, as shown in FIGS. 2 to 5.

Then, in S130, ECU 300 causes a determination to be made of whether or not vehicle speed SPD has increased to upper limit value UL of the acceptable speed range.

As described above, immediately after the start of the driving power variation operation, motor generator 135 and engine 160 are initially put in a low output state and inertial running is performed. Thus, vehicle speed SPD is lower than upper limit value UL, and gradually decreases.

That is, since vehicle speed SPD has not increased to upper limit value UL of the acceptable speed range (NO in S130), the process proceeds to S135, and ECU 300 then causes a determination to be made of whether or not vehicle speed SPD has decreased to lower limit value LL of the acceptable speed range.

While vehicle speed SPD decreases within the acceptable speed range (LL<SPD<UL), namely, when vehicle speed SPD has not decreased to lower limit value LL of the acceptable speed range (NO in S135), the process proceeds to S144, and ECU 300 causes a current state of motor generator 135 and engine 160 to be maintained, to continue the inertial running in a low output state. The process then returns to the main routine, and the process is performed again from S100 in the next control cycle.

Then, when vehicle speed SPD decreases to lower limit value LL of the acceptable speed range (SPD<LL) while the inertial running is continued (YES in S135), the process proceeds to S142, and ECU 300 causes motor generator 135 and engine 160 to be switched to a high output state to perform acceleration running. Vehicle speed SPD thus increases. Although not shown in FIG. 6, in a specific case such as where the temperatures of engine 160 itself and the catalyst have not been sufficiently increased, the output of engine 160 may be maintained in a low output state, as was described with reference to FIG. 3.

If acceleration running is selected in S142, in S150, ECU 300 causes a determination to be made of whether or not the SOC has fallen below the prescribed threshold value and thus needs to be recovered by charging of power storage device 110.

If the SOC needs to be recovered (YES in S150), the process proceeds to S160, and ECU 300 causes the driving power of engine 160 to be increased to drive motor generator 130 (MG1), and causes power storage device 110 to be charged with the electric power generated by motor generator 130. ECU 300 also causes the ratio of the driving power of motor generator 135 to be decreased and the ratio of the driving power of engine 160 to be increased.

If the SOC does not need to be recovered (NO in S150), on the other hand, the processing in S160 is skipped, and ECU 300 causes motor generator 135 and engine 160 to be driven in a high output state with the driving power of the ratio set in S142, to perform acceleration running.

While the vehicle speed increases within the acceptable speed range due to the acceleration running being performed, NO is selected in S130 and S135. Then, in S144, ECU 300 causes the acceleration running to be continued until vehicle speed SPD reaches upper limit value UL of the acceptable speed range.

Then, when vehicle speed SPD increases to upper limit value UL of the acceptable speed range (YES in S130), the process proceeds to S140, and ECU 300 causes motor generator 135 and engine 160 to be switched to a low output state to perform inertial running.

While the user request power is maintained substantially constant, the driving power variation operation as described above is performed so as to maintain vehicle speed SPD within the acceptable speed range.

If the user request power varies for the purpose of acceleration or deceleration (NO in S110), on the other hand, the process proceeds to S125, and ECU 300 causes the driving power variation operation to be suspended.

Then, when acceleration is indicated by the user request power (YES in S127), ECU 300 causes the driving power of engine 160 and/or motor generator 135 to be increased, to accelerate vehicle 100 (S146).

When deceleration is indicated by the user (NO in S127), on the other hand, the process proceeds to S148, and ECU 300 causes either deceleration by inertial running in which motor generator 135 and engine 160 are put in a low output state, or deceleration involving regenerative braking in which motor generator 135 is driven in a regenerative state while engine 160 is put in a low output state, to be performed. Alternatively, the vehicle may be decelerated by switching between the deceleration by inertial running and the deceleration involving regenerative braking.

Then, when the acceleration or deceleration operation by the user ends and the user request power becomes substantially constant (YES in S110), the driving power variation operation is resumed.

By performing the control in accordance with the process as described above, when the user request power is substantially constant in the hybrid vehicle including the engine and the motor generator, the driving power variation operation is performed on both the motor generator and the engine, thereby attaining running involving inertial running. As a result, energy efficiency during the vehicle running can be improved.

Although the motor generator is used as a main driving source and the engine is used as an auxiliary driving source in the exemplary configuration described above, the engine may be used as a main driving source and the motor generator may assist the driving power in an opposite manner. Alternatively, a determination about which one of the driving sources should be used as a main driving source may be made depending on the magnitude of power requested by the user and the driving situation such as vehicle speed.

[Modifications]

In the embodiment above, the hybrid vehicle including the engine and the motor generator as a plurality of driving sources was described by way of example. The present invention is also applicable to vehicles having other configurations, such as an electric vehicle having a twin motor configuration capable of running with driving power from two motor generators as a plurality of driving sources, as shown in FIG. 7, for example.

Figure 7:
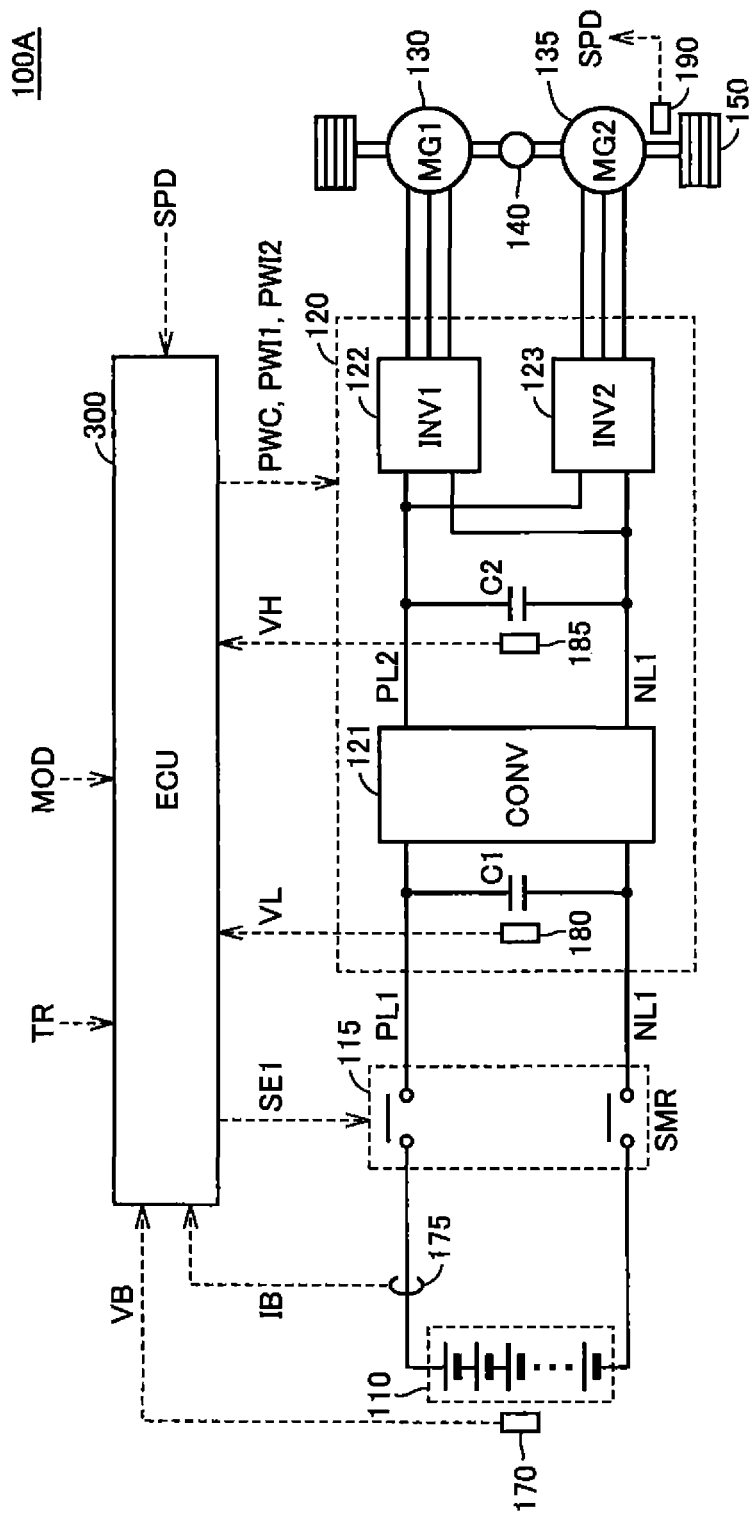
FIG. 7 is an overall block diagram of a vehicle including two motor generators as driving sources.

A vehicle 100A in FIG. 7 has the configuration of vehicle 100 in FIG. 1 which is not provided with engine 160. Vehicle 100A runs with driving power from both motor generator 130 (MG1) and motor generator 135 (MG2).

In this case, although power storage device 100 cannot be charged as described above, similar control can be performed by replacing the driving power from engine 160 with an output from motor generator 130 in the time charts shown in FIG. 2 and the like.

The present invention is also applicable to the case where MG1 is used as a motor rather than as a generator and the vehicle runs with driving power generated by three driving sources of motor generators 130, 135 and engine 160, in the configuration of FIG. 1.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100, 100A vehicle; 110 power storage device; 115 SMR; 120 PCU; 121 converter; 122, 123 inverter; 130, 135 motor generator; 140 power transmission gear; 150 drive wheel; 160 engine; 170, 180, 185 voltage sensor; 175 current sensor; 190 speed sensor; 300 ECU; C1, C2 capacitor; PL1, PL2, NL1 power line.

The invention claimed is:

1. A vehicle comprising:
a first driving source and a second driving source configured to generate driving power for running the vehicle; and
a control device configured to control the first and second driving sources,
the control device being configured to drive a vehicle and being configured to (1) execute a driving power variation operation on the first driving source such that the first driving source switches between a first state, where the first driving source generates driving power at a first level that is greater than zero, and a second state, where the first driving source generates driving power that is higher than the first level, and (2) execute a driving power variation operation on the second driving source such that the second driving source switches between a third state, where the second driving source generates driving power at a second level that is greater than zero, and a fourth state, where the second driving source generates driving power that is higher than the second level, and
one of the first driving source and the second driving source is an engine, and the other of the first driving source and the second driving source is a rotating electric machine.

2. The vehicle according to claim 1, wherein
the control device causes the driving power variation operation to be performed on the first and second driving sources, when driving power requested by a user varies within a prescribed range.

3. The vehicle according to claim 2, wherein
the control device causes the first driving source to be switched between the first state and the second state so as to maintain a speed of the vehicle within an acceptable range, while the driving power variation operation is performed on the first and second driving sources.

4. The vehicle according to claim 3, wherein
the control device causes the first driving source to be switched to the first state in response to an increase in the speed of the vehicle to an upper limit of the acceptable range, and causes the first driving source to be switched to the second state in response to a decrease in the speed of the vehicle to a lower limit of the acceptable range.

5. The vehicle according to claim 1, wherein
the control device causes the second driving source to be switched to the fourth state during a period when the first driving source is in the second state.

6. The vehicle according to claim 5, wherein
the control device causes the second driving source to be switched to the third state during a period when the first driving source is in the first state, and causes the second driving source to be switched to the fourth state during a period when the first driving source is in the second state.

7. The vehicle according to claim 1, wherein
a sum of the driving power generated by the first driving source in the first state and the driving power generated by the second driving source in the third state is set to be smaller than reference driving power of constant output capable of maintaining a speed of the vehicle, and
a sum of the driving power generated by the first driving source in the second state and the driving power generated by the second driving source in the fourth state is set to be larger than the reference driving power.

8. The vehicle according to claim 7, wherein
the vehicle runs mainly with inertial force of the vehicle when the first driving source is in the first state.

9. A vehicle comprising:
a first rotating electric machine and a second rotating electric machine configured to generate driving power for running the vehicle; and
a control devices configured to control the first rotating electric machine and the second rotating electric machine,
the control device being configured to drive a vehicle and being configured to (1) execute a driving power variation operation on the first rotating electric machine such that the first rotating electric machine switches between a first state, where the first driving source generates driving power at a first level, and a second state, where first rotating electric machine generates driving power that is higher than the first level, and (2) execute a driving power variation operation on the second rotating electric machine such that the second driving source switches between a third state, where the second rotating electric machine generates driving power at a second level, and a fourth state, where second rotating electric machine generates driving power that is higher than the second level.

10. A method of controlling a vehicle including a first driving source and a second driving source, comprising the steps of:
driving the first driving source so as to switch the first driving source between a state where the first driving source generates driving power at a first level that is greater than zero and a state where the first driving source generates driving power that is higher than the first level;
driving the second driving source so as to switch the second driving source between a state where the second driving source generates driving power at a second level that is greater than zero and a state where the second driving source generates driving power that is higher than the second level; and
running the vehicle with the driving power from the first and second driving sources, one of the first driving source and the second driving source is an engine and the other of the first driving source and the second driving source is a rotating electric machine.

11. A method of controlling a vehicle including a first rotating electric machine and a second rotating electric machine, comprising the steps of:
driving the first rotating electric machine so as to switch the first rotating electric machine between a state where the first rotating electric machine generates driving power at a first level that is greater than zero and a state where the first rotating electric machine generates driving power that is higher than the first level; and
driving the second rotating electric machine so as to switch the second rotating electric machine between a state where the second rotating electric machine generates driving power at a second level that is greater than zero and a state where the second rotating electric machine generates driving power that is higher than the second level.

* * * * *